United States Patent
Johlic et al.

(10) Patent No.: US 9,024,977 B2
(45) Date of Patent: May 5, 2015

(54) RESIZING OBJECTS IN REGIONS OF VIRTUAL UNIVERSES

(75) Inventors: Marc K. Johlic, Seminole, FL (US); Andrew J. LaHart, Arnold, MD (US); Emi K. Olsson, Germantown, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 12/848,351

(22) Filed: Aug. 2, 2010

(65) Prior Publication Data

US 2012/0026177 A1 Feb. 2, 2012

(51) Int. Cl.
*G06T 3/40* (2006.01)
*G09G 5/00* (2006.01)
*G06T 19/20* (2011.01)

(52) U.S. Cl.
CPC .......... *G09G 5/00* (2013.01); *G09G 2340/0407* (2013.01); *G09G 2340/14* (2013.01); *G06T 19/20* (2013.01); *G06T 2219/2016* (2013.01)

(58) Field of Classification Search
CPC ................ G09G 2340/0407; G09G 2340/045; G09G 5/14; G09G 2340/0414; G06F 17/00; G06F 3/0481; G06F 9/4443; G06T 3/40
USPC .................. 345/660, 666, 633, 473; 715/757; 358/118
See application file for complete search history.

(56) References Cited

U.S. PATENT DOCUMENTS

| | | | |
|---|---|---|---|
| 6,151,027 A | 11/2000 | Yoo | |
| 7,609,260 B2 | 10/2009 | Sugio et al. | |
| 7,692,658 B2 | 4/2010 | Moore | |
| 7,712,046 B2 | 5/2010 | Ngari et al. | |
| 7,961,938 B1 * | 6/2011 | Remedios | 382/162 |
| 2004/0130614 A1 * | 7/2004 | Valliath et al. | 348/14.01 |
| 2005/0134693 A1 | 6/2005 | Torimoto et al. | |
| 2005/0188326 A1 * | 8/2005 | Ikeda | 715/788 |
| 2006/0181535 A1 * | 8/2006 | Watt | 345/473 |
| 2007/0033542 A1 | 2/2007 | Winser et al. | |
| 2007/0033544 A1 | 2/2007 | Fleisher et al. | |
| 2007/0052732 A1 | 3/2007 | Schechter et al. | |
| 2008/0021938 A1 * | 1/2008 | Jha | 707/205 |
| 2009/0058862 A1 * | 3/2009 | Finn et al. | 345/473 |
| 2009/0109229 A1 * | 4/2009 | Hamilton et al. | 345/474 |
| 2009/0109243 A1 * | 4/2009 | Kraft et al. | 345/660 |
| 2009/0144638 A1 * | 6/2009 | Haggar et al. | 715/757 |

* cited by examiner

OTHER PUBLICATIONS

MLA Bouras, Christos, et al. "An Integrated Platform for Educational Virtual Environments.", 2006, Web-Based Intelligent e-Learning Systems: Technologies and Applications, IDEA Group Pub: 291-320; http://ru6.cti.gr/ru6/publications/81341159.pdf.*

*Primary Examiner* — Mark Zimmerman
*Assistant Examiner* — Sarah Le
(74) *Attorney, Agent, or Firm* — William E. Schiesser; Maxine L. Barasch; Keohane & D'Alessandro PLLC

(57) ABSTRACT

Embodiments of the present invention provide an approach to resize (e.g., shrink and/or enlarge) objects in a region of a VU so that additional objects can be accommodated. Specifically, embodiments of the present invention provide a mechanism for a region/room to calculate when it has reached full capacity, and use a configurable multiplier to decrease the size of all objects in the room, including avatars, desks, chairs, tables, etc. This allows for accommodation of a significantly higher quantity of objects within the region. In a typical embodiment, the transition to smaller size would be seamless to the user. Moreover, in one embodiment, if the room is of a certain type (e.g., auditorium), additional objects may be auto-created or deleted based on the number of avatars entering or exiting the room. Still yet, objects can be enlarged as the occupancy falls below the capacity.

13 Claims, 8 Drawing Sheets

RESIZING OBJECTS IN REGIONS OF VIRTUAL UNIVERSES

TECHNICAL FIELD

The present invention generally relates to virtual universes (VUs). Specifically, the present invention relates to the resizing (e.g., reducing and/or enlargement) of objects (e.g., avatars, buildings, etc.) within a region of a virtual universe so that capacity of the region can be maintained while additional objects can be accommodated therein.

BACKGROUND

VUs are computer-based simulated environments intended for its users or residents to inhabit and interact via avatars, which are personas or representations of the users of the virtual universes. These types of virtual universes are now most common in multiplayer online games, such as Second Life®, which is a trademark of Linden Research Inc. in the United States. Avatars in these types of virtual universes have a wide range of business and social experiences. Currently, when there is a large crowd congregating in a building or region of a VU, only a finite number of objects (e.g., avatars, tables, chairs, etc.) can fit into the room. This in turn limits the number of people that can attend an event, meeting, conference, or other gathering. As such, the gathering can only be as large as the virtual space will allow (i.e., the capacity of the space). When this occurs, queues of avatars will be formed to gain access to the region.

SUMMARY

Embodiments of the present invention provide an approach to resize (e.g., shrink and/or enlarge) objects in a region of a VU so that additional objects can be accommodated. Specifically, embodiments of the present invention provide a mechanism for a region/room to calculate when it has reached full capacity, and use a configurable multiplier to decrease the size of all objects in the room, including avatars, desks, chairs, tables, etc. This allows for accommodation of a significantly higher quantity of objects within the region. In a typical embodiment, the transition to smaller size would be seamless to the user. Moreover, in one embodiment, if the room is of a certain type (e.g., auditorium), additional objects may be auto-created or deleted based on the number of avatars entering or exiting the room. Still yet, objects can be enlarged as the occupancy falls below the capacity.

A first aspect of the present invention provides a method for resizing objects in a region of a virtual universe (VU), comprising: determining whether a region of the VU would exceed a capacity by adding a proposed object to the region; and reducing a size of existing objects in the region by a multiplier, the multiplier being based on an amount by which the capacity of the region would be exceeded by addition of the proposed object.

A second aspect of the present invention provides a system for resizing objects in a region of a virtual universe (VU), comprising: a bus; a processor coupled to the bus; and a memory medium coupled to the bus, the memory medium comprising instructions to: determine whether a region of the VU would exceed a capacity by adding a proposed object to the region; and resize existing objects in the region by a multiplier, the multiplier being based on an amount by which the capacity of the region would be exceeded by addition of the proposed object.

A third aspect of the present invention provides a computer program product for resizing objects in a region of a virtual universe (VU), the computer program product comprising: a computer readable storage media; and program instructions stored on the computer readable storage media to: determine whether a region of the VU would exceed a capacity by adding a proposed object to the region; and reduce a size of existing objects in the region by a multiplier, the multiplier being based on an amount by which the capacity of the region would be exceeded by addition of the proposed object.

A fourth aspect of the present invention provides a method for deploying a system for resizing objects in a virtual universe (VU), comprising: providing a computer infrastructure being operable to: determine whether a region of the VU would exceed a capacity by adding a proposed object to the region; and reduce a size of existing objects in the region by a multiplier, the multiplier being based on an amount by which the capacity of the region would be exceeded by addition of the proposed object.

BRIEF DESCRIPTION OF THE DRAWINGS

These and other features of this invention will be more readily understood from the following detailed description of the various aspects of the invention taken in conjunction with the accompanying drawings in which.

Figure 1:
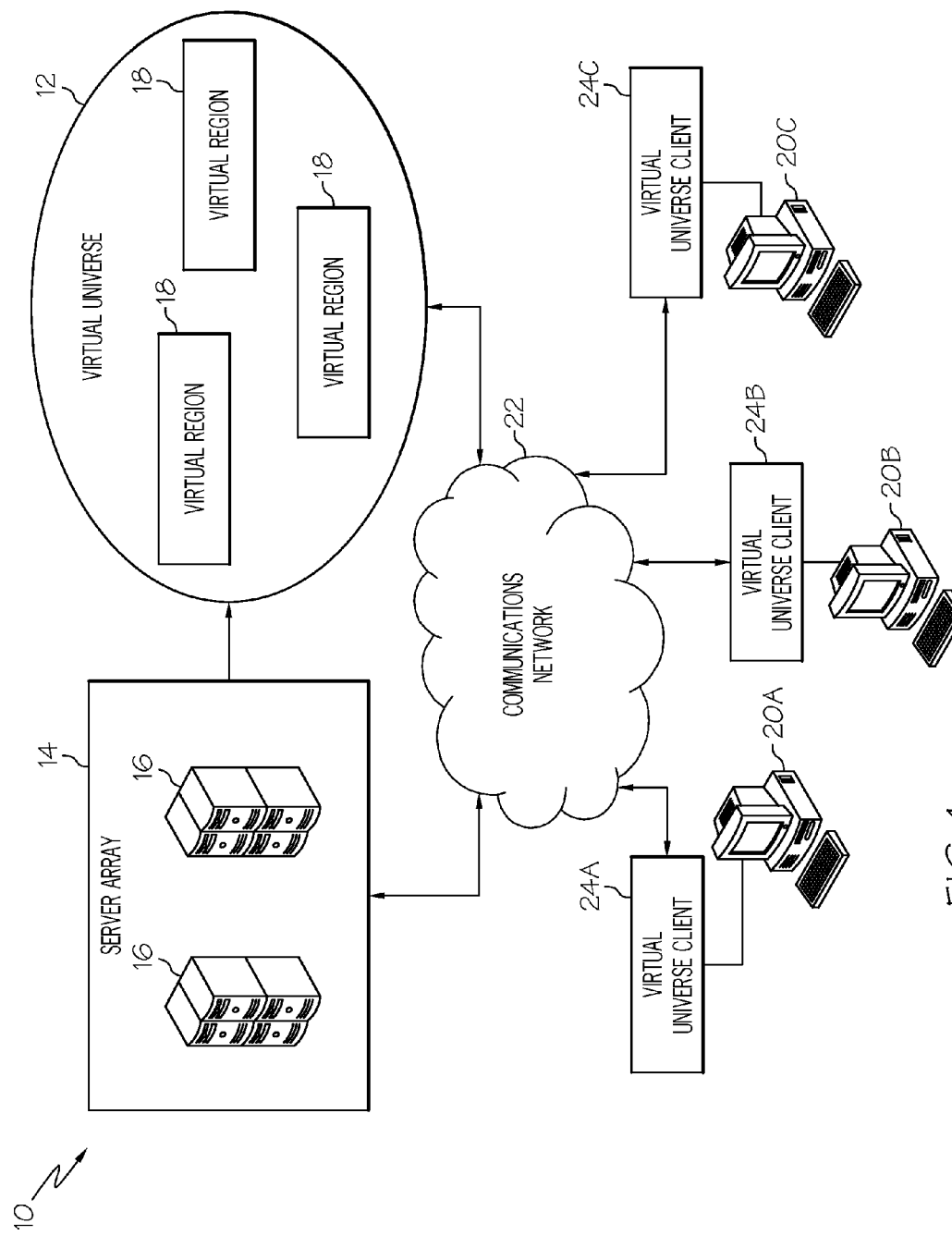
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention provide an approach to resize (e.g., shrink and/or enlarge) objects in a region of a VU so that additional object can be accommodated. Specifically, embodiments of the present invention provide a mechanism for a region/room to calculate when it has reached full capacity and use a configurable multiplier to decrease the size of all objects in the room, including avatars, desks, chairs, tables, etc. This allows for accommodation of a significantly higher quantity of objects within the region. In a typical embodiment, the transition to smaller size would be seamless to the user. Moreover, in one embodiment, if the room is of a certain type (e.g., auditorium), additional objects may be auto-created or deleted based on the number of avatars entering or exiting the room. Still yet, objects can be enlarged as the occupancy falls below the capacity. As used herein, the term region is intended to mean any area (e.g., a room, a building, etc.) of a VU in which objects can exist.

FIG. 1 shows a high-level schematic diagram showing a networking environment 10 for providing a virtual universe (VU) 12 according to one embodiment of this invention in which a service for providing resizing objects in a region of a VU can be utilized. As shown in FIG. 1, networking environment 10 comprises a server 14, which may be an array or grid of multiple servers 16 each responsible for managing a portion of virtual real estate within VU 12. A virtual universe provided by a multiplayer online game, for example, can employ many of servers to manage all of the virtual real estate. The virtual content of VU 12 is comprised of a number of objects, each having associated texts/scripts, defined in a programming language readable by VU 12. The virtual content is managed by server 14 and may show up in VU 12 as one or more virtual regions 18. Like the real world, each virtual region 18 within VU 12 comprises a landscape having virtual content, such as buildings, stores, clubs, sporting arenas, parks, beaches, cities, and towns, all created by administrators or residents of the virtual universe that are represented by avatars. These examples of virtual content are only illustrative of some things that may be found in a virtual region and are not limiting. Furthermore, the number of virtual regions 18 shown in FIG. 1 is only for illustration purposes, and those skilled in the art will recognize that there may be many more regions found in a typical virtual universe, or even only one region in a small virtual universe. FIG. 1 also shows that users operating computers 20A-20C (hereinafter referred to generally as 20) interact with VU 12 through a communications network 22 via virtual universe clients 24A-24C (hereinafter referred generally as 24) that reside in computers 20, respectively. Below are further details of VU 12, server 14, and virtual universe client 24.

One of the ways that users or administrators can interact with the virtual universe is to create virtual content for the virtual universe. An illustrative but non-limiting listing of virtual content that can be created includes items such as apparel for avatars, animations for a multitude of purposes (e.g., advertisements, instructional material, etc.), avatar accessories (e.g., jewelry, hairpieces, clothing, etc.), scripts for performing certain functions in the virtual universes, building components, avatar appearance features, recreational equipment (e.g., bicycles), automobiles, etc. As will be further described herein, embodiments of this invention are directed to resizing objects in a region of a VU.

Figure 2:
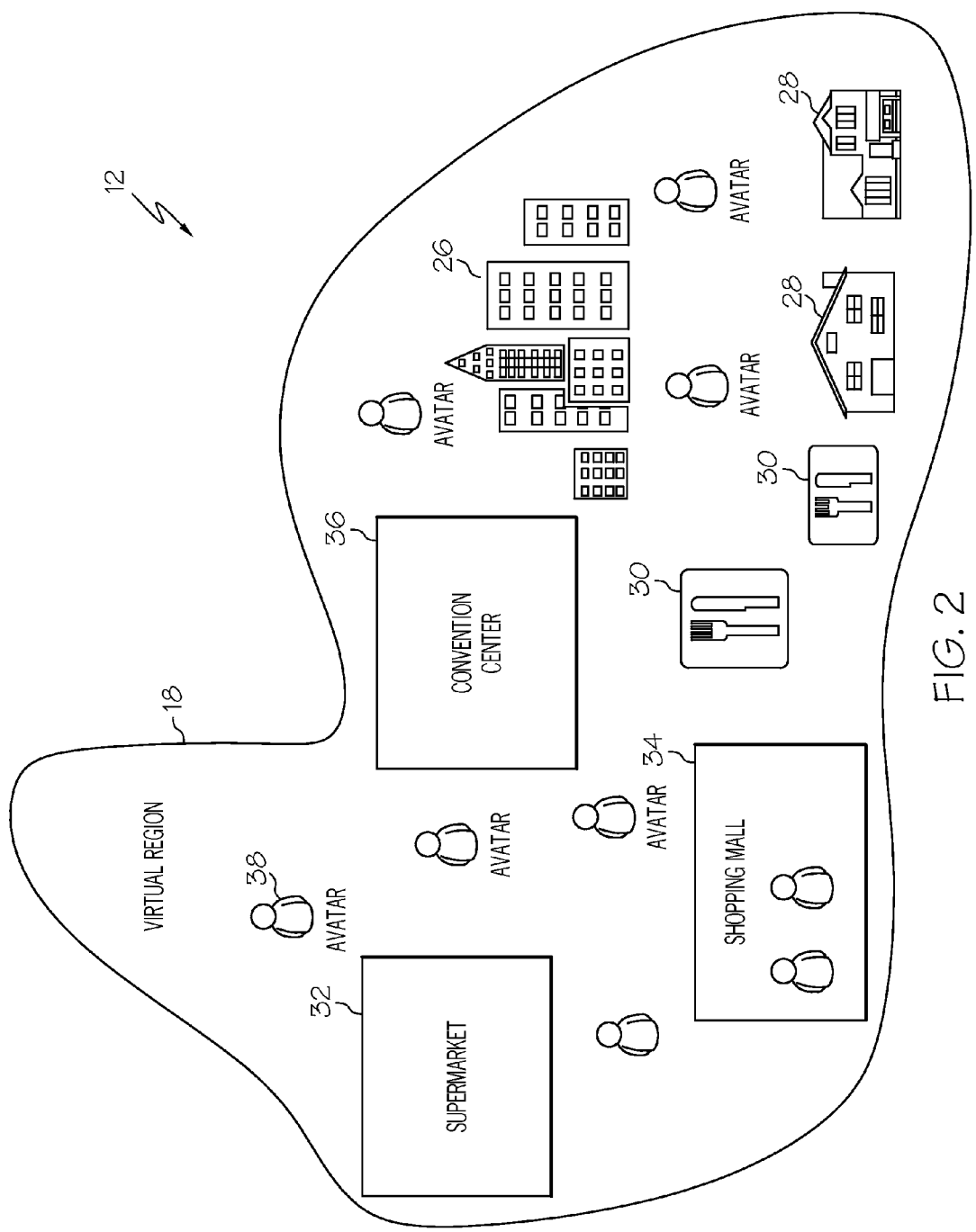
FIG. 2 shows a more detailed view of a virtual region shown in the virtual universe of FIG. 1.

FIG. 2 shows a more detailed view of what one virtual region 18 in VU 12 may comprise. As an example, virtual region 18 shown in FIG. 2 comprises a downtown office center 26, homes 28, restaurants 30, a supermarket 32, a shopping mall 34 for shopping, and a convention center 36 for meetings and various conventions. Residents or avatars 38 which, as mentioned above, are personas or representations of the users of the virtual universe, roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have more virtual content that can be found in the real world, as well as things that do not presently exist in the real world.

Figure 3:
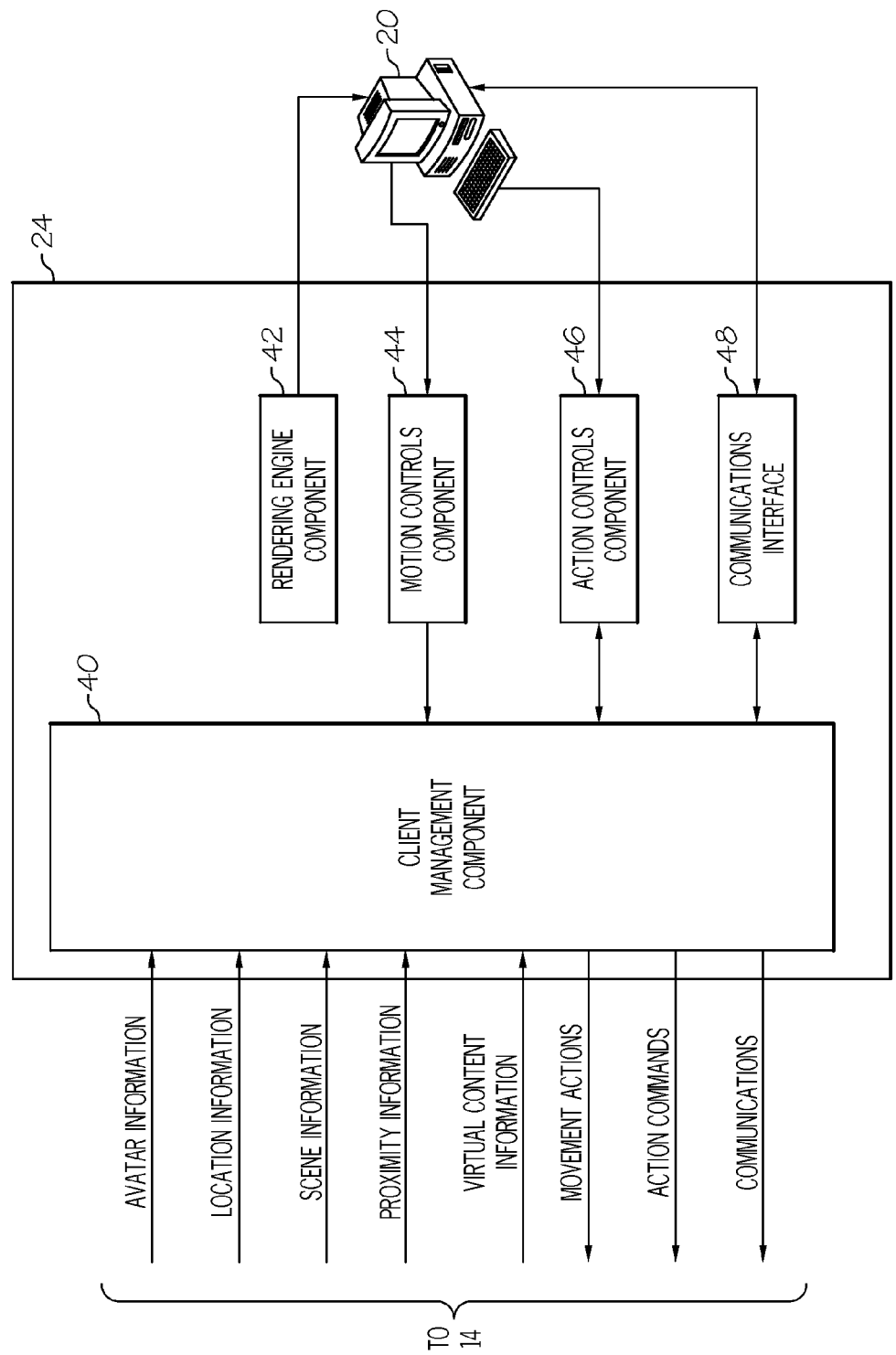
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands, and communications made by a user through computer 20, and information received from the virtual universe through server 14. A rendering engine component 42 enables the user of computer 20 to visualize his or her avatar within the surroundings of the particular region of VU 12 where the avatar is presently located. As will be further described herein, rendering engine 42 receives virtual content in VU 12 and renders it for display to the user of computer 20.

A motion controls component 44 enables the user's avatar(s) to make movements through the virtual universe. In one embodiment, movements through the virtual universe can include, for example, gestures, postures, walking, running, driving, flying, etc. An action control component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking, and electronic mail (email).

FIG. 3 shows the various types of information received by client management component 40 from the virtual universe through server 14. In particular, client management component 40 receives avatar information about the avatars that are in proximity to the user's avatar. In addition, client management component 40 receives location information about the area that the user's avatar is near (e.g., what region or land the avatar is in), as well as scene information (e.g., what the avatar sees). Client management component 40 also receives proximity information, which contains information on what the user's avatar is near, and virtual content information, which is information about the objects, texts, and scripts of the virtual content renderable in the virtual universe. FIG. 3 also shows the movement commands and action commands that are generated by the user and sent to the server via client management component 40, as well as the communications that can be sent to the users of other avatars within the virtual universe.

Figure 4:
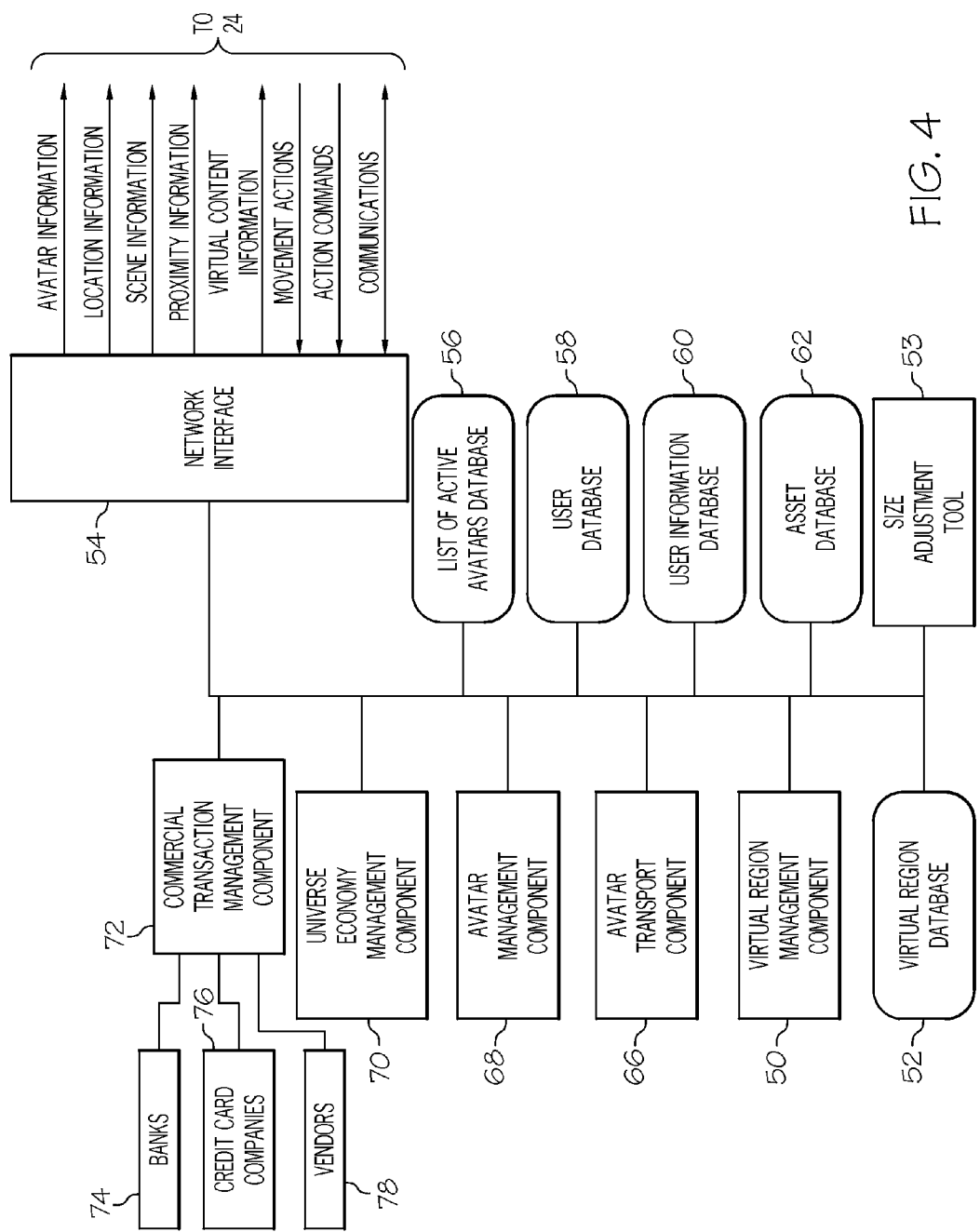
FIG. 4 shows a more detailed view of some of the functionalities provided by the server shown in FIG. 1.

FIG. 4 shows a more detailed view of some of the functionalities provided by server 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

FIG. 4 also shows a size adjustment tool 53, which provides the capability to resize objects in a region of the VU based upon the capacity and corresponding occupancy of the region. Specifically, each object in a VU, be it an avatar or an inanimate object, takes up a certain amount of space in a room/region. Under embodiments of the present invention, a region could be constructed to contain a script that automatically calculates the total amount of space being used at any given time in the region (e.g., occupancy to capacity ratio). When a certain percentage of the region is occupied, the region would automatically resize objects. The objects would typically be resized at the same decrease percentage, so that the change would be seamless to the user. When resized in this manner more objects would be able to fit into the exact same region. Under these parameters, the following scenario could be implemented:

1. Avatar enters a region.
2. Is the region (a customizable number)?
2(A). Yes—Resize objects in room to X %.
2(B). No—Allow avatar to enter unchanged.

Example: A room object is built to fit 10 avatars comfortably. When the 11th avatar enters the room, all objects including the avatars are shrunk to 90.9% of its original size to maintain the same capacity and space limitations. Similarly, when the 15th person has entered the room, all objects and the avatars in the room will have shrunk to 66.6% of its original size. As the avatars causing the capacity to be exceeded leave the region, the size of the remaining objects could be enlarged proportionally. Optionally, if a room is of a certain type such as an auditorium where there are objects corresponding to the number of avatars in the room, these objects may multiply accordingly while at the same time resizing to allow for additional capacity.

As shown in FIG. 4, there are several different databases for storing information. In particular, virtual region database 52 stores information on all of the specifics in the virtual region that virtual region management component 50 is managing. Virtual region database 52 contains metadata information about the objects, texts, and scripts associated with the virtual content in the virtual region(s) of VU 12. List of active avatars database 56 contains a list of all the avatars that are online in the VU 12, while user database 58 and information database 60 contain information on the actual human users of VU 12. In one embodiment, user database 58 contains general information on the users such as names, email addresses, locales, interests, ages, preferences, etc., while user information database 60 contains additional information on the users such as billing information (e.g., credit card information) for taking part in transactions. In an exemplary embodiment, user database 58 contains information about the priority of each of avatars 38 within region 18 of virtual universe 12. As will be further described below, avatar priority may be used to prioritize access to region 18 in cases of where avatar crowding and performance degradation are possible.

Asset database 62 contains information on the avatars of the users that reside in VU 12. In one embodiment, asset database 62 contains information on the virtual content within the personal inventories of each avatar of the virtual universe. An illustrative but non-limiting listing of the virtual content that can be present in asset database 62 includes avatar accessories (e.g., clothing), virtual pets, vehicles, electronic media (e.g., music files), graphics files, sound files, animations, electronic documents, video files, avatar body parts, avatar tools, calling cards, note cards, photos and photo albums, or any other type of virtual content.

Those skilled in the art will also recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server 14 and virtual universe client 24, or reside on separate computers in direct communication with virtual universe server 14 and virtual universe client 24.

An avatar transport component 66 enables users to transport, which, as mentioned above, allows avatars to transport through space from one point to another point instantaneously. As a result, an avatar could, for example, travel from a business region to an entertainment region to experience a concert.

An avatar management component 68 logs what the avatars are doing while in the virtual universe. For example, avatar management component 68 can determine where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, a user might want to pay for a service that automatically reduces server load by resizing objects in a region of a VU. In this case, the user (via his/her avatar) would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76, and vendors 78.

Figure 5:
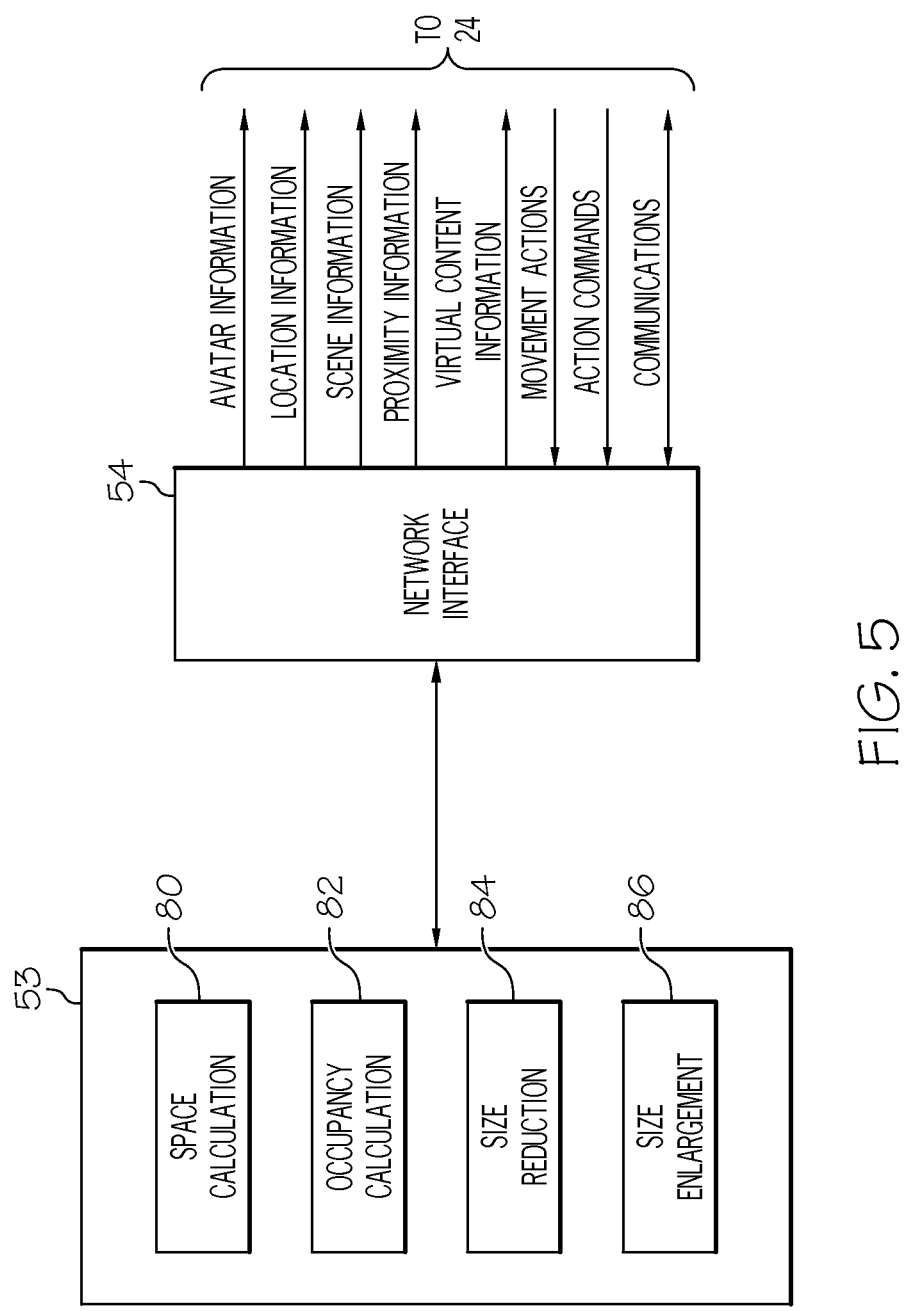
FIG. 5 shows a size adjustment tool according to one embodiment of the present invention that operates in the environment shown in FIG. 1.
Figure 6:
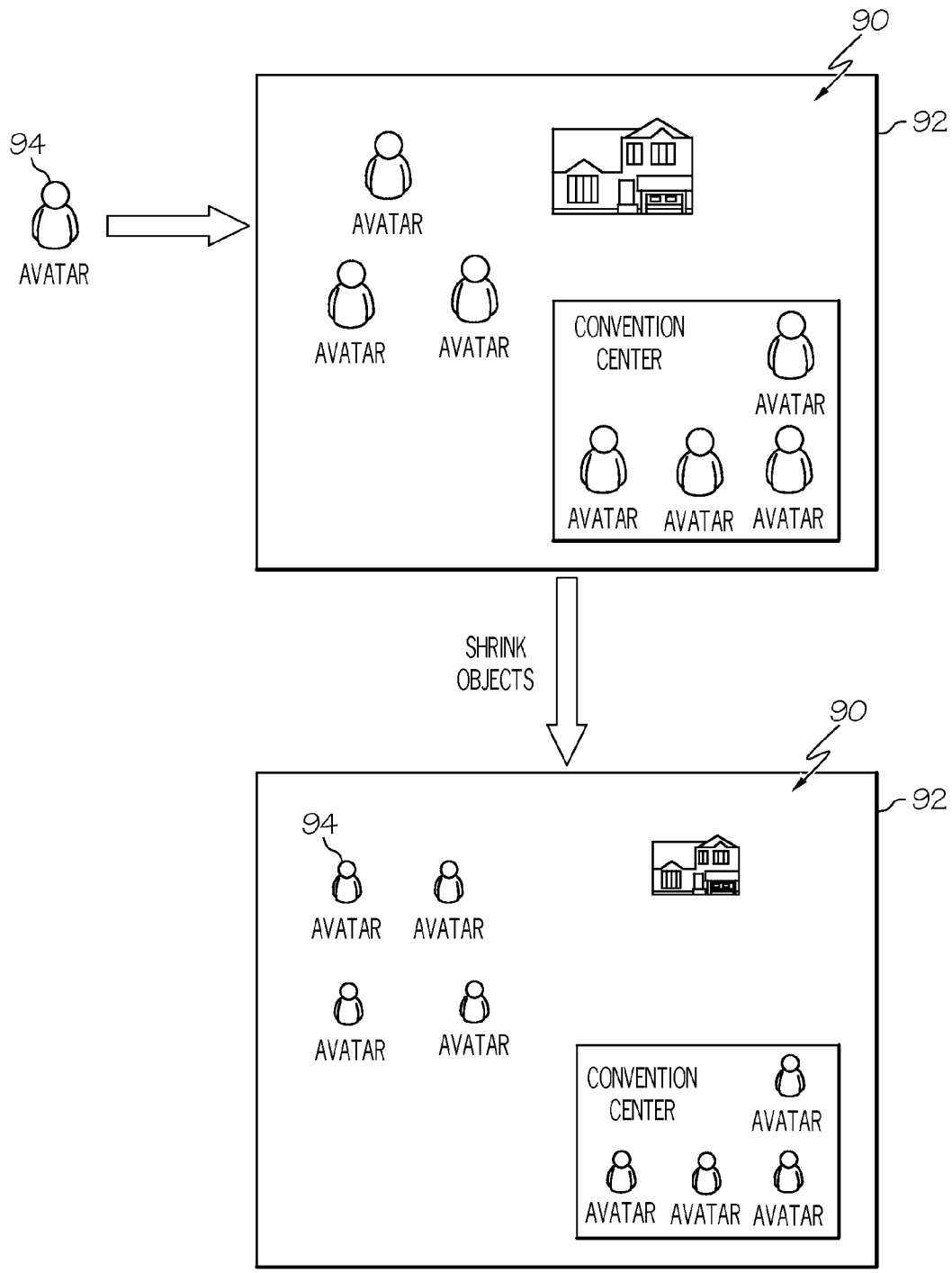
FIG. 6 shows the reduction of objects in a region of a VU according to one embodiment of the present invention.

Referring to FIG. 5, a more detailed diagram of size adjustment tool 53 of FIG. 4 is shown. The functions of size adjustment tool 53 will be explained in conjunction with both FIGS. 5 and 6. As depicted, size adjustment tool 53 comprises space calculation component 80, occupancy calculation component 82, size reduction component 84, and size enlargement component 86. As shown in FIG. 6, a region/room 90 having objects 92 is depicted. Objects 92 can be any type of virtual entity/item such as an avatar, a building, etc. As further depicted, avatar 94 wishes to gain access to the region. Under a typical embodiment of the present invention, space calculation component 80 would determine the total capacity/space of room 90 and occupancy calculation component 82 would determine whether region 90 would exceed the calculated capacity by allowing avatar 94 to be added thereto. Assuming in this example that the capacity would be approached or exceeded, side reduction component 82 would reduce a size of existing objects 92 in the region 90 by a configurable multiplier. This multiplier is typically based on an amount by which the capacity of the region 90 would be exceeded by addition of the proposed object 94. For example, if the addition of avatar 94 to region 90 would cause the capacity to be exceeded by 10%, then objects 92 and 94 would be reduced in size by 10%. Thereafter, avatar 94 could be added to region 90 without unduly compromising the capacity thereof. Similarly, when avatar 84 exits region 90, size enlargement component 86 could enlarge objects 92 and 94 using the same multiplier-based approach. As such, under embodiments of the present invention, objects can be reduced and/or enlarged in size proportionally with respect to the capacity of their region.

Figure 7:
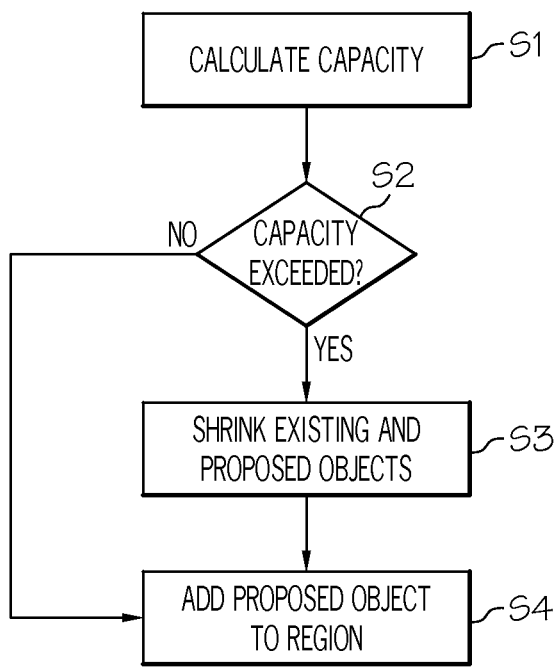
FIG. 7 shows a method flow diagram according to an embodiment of the present invention.

Referring now to FIG. 7, a method flow diagram according to the present invention is shown. In step S1, the capacity of a region is calculated. In step S2, it is determined whether the capacity will be exceeded by addition of a proposed object thereto. If not, the region object can be added to the region in step S4. However, if the capacity will be exceeded, the existing objects and the proposed object can be shrunk in step S3, before the proposed object is added in step S4.

It is understood that the capacity need not be exceeded for objects to be reduced in size hereunder. Rather, a predetermined capacity threshold could be set that allows for objects to be resized when the capacity is approached by a predetermined amount. For example, if a capacity threshold of 5% is set, the objects could be shrunk when the capacity would be at 95% with the addition of the proposed object.

In another embodiment of this invention, size adjustment tool 53 is used as a service to charge fees for resizing objects in a region of the VU. Along these lines, although not shown in FIG. 5, size adjustment tool 53 could further comprise a transaction component configured to charge a fee for providing object resizing. In this embodiment, the provider of the virtual universes or the third party service providers could offer this transaction as a service by performing the functionalities described herein on a subscription and/or fee basis. In this case, the providers of the virtual universes or the third party service providers can create, deploy, maintain, support, etc., size adjustment tool 53 that performs the processes described in the invention. In return, the virtual universes or the third party service providers can receive payment from the virtual universe residents via universe economy management component 70 and commercial transaction management component 72 (FIG. 4).

In still another embodiment, the methodologies disclosed herein can be used within a computer system to provide object resizing in a virtual universe. In this case, size adjustment tool 53 can be provided, and one or more systems for performing the processes described in the invention can be obtained and deployed to a computer infrastructure. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 8:
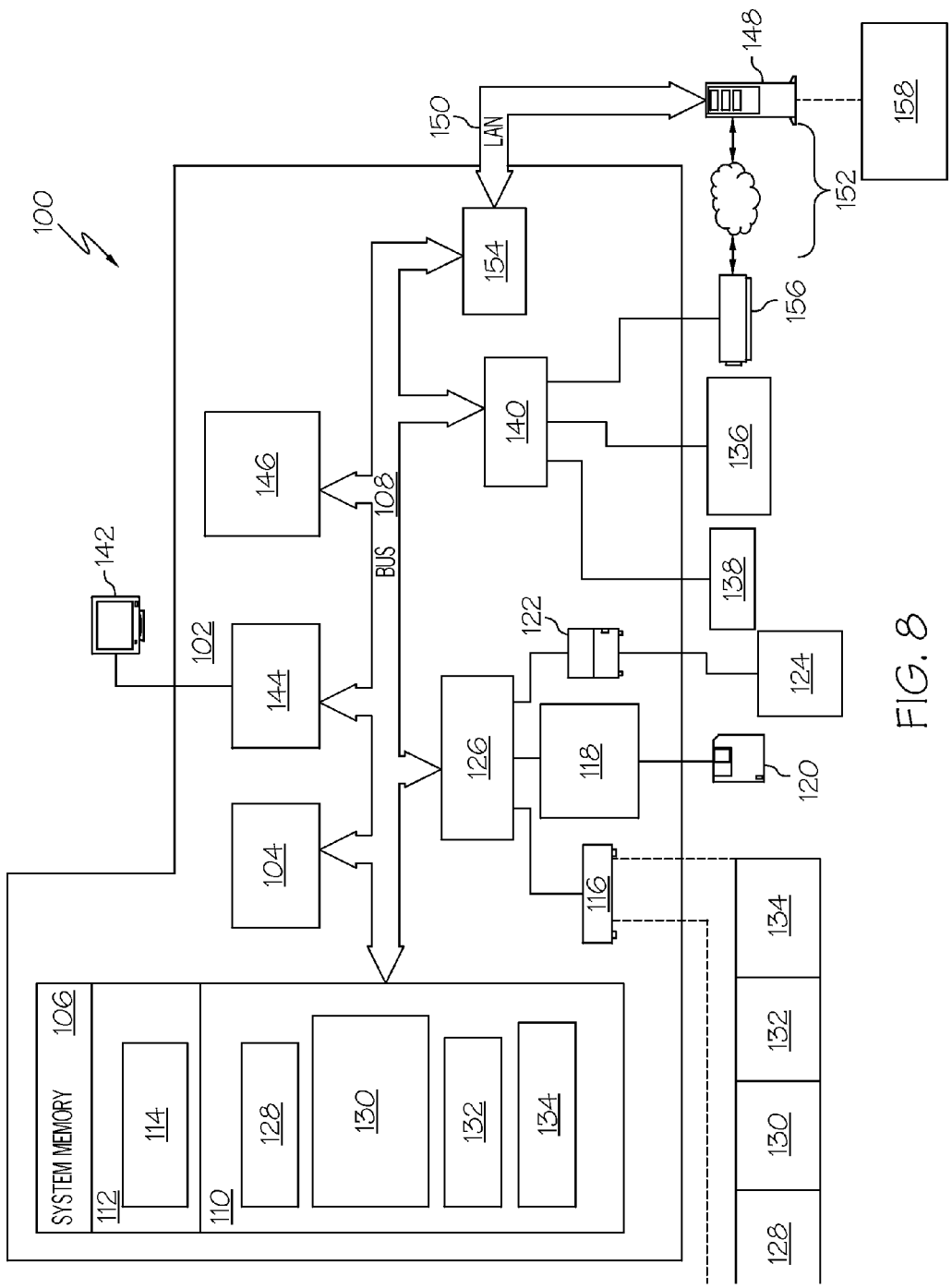
FIG. 8 shows a schematic of an exemplary computing environment in which elements of the networking environment shown in FIG. 1 may operate.

FIG. 8 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency relating to any one or combination of components illustrated in FIG. 8.

In the computing environment 100, there is a computer 102, which is operational with numerous other general purpose or special purpose computing system environments or configurations. Examples of well-known computing systems, environments, and/or configurations that may be suitable for use with computer 102 of the present invention include, but are not limited to, personal computers, server computers, thin clients, thick clients, hand-held or laptop devices, cellular telephones, personal digital assistants (PDA), multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on, that perform particular tasks or implement particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 8, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 8, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 8 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide non-volatile storage of computer readable instructions, data structures, program modules, and other data for computer 102. Although the exemplary environment described herein employs hard disk 116, a removable magnetic disk 118, and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including server 14 and virtual universe client 24. In one embodiment, the one or more application programs 130 include components of size adjustment tool 53.

The one or more program modules 130 carry out the methodologies disclosed herein. The flowchart of FIG. 7 illustrates the architecture, functionality, and operation of possible implementations of systems, methods, and computer program products according to various embodiments of the present invention. In this regard, each block in the flowchart may represent a module, multiple modules, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 8, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 8 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the computer 102, or portions thereof, may be stored in a remote memory storage device. By way of example, and not limitation, FIG. 8 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store "communication media" that typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

It is apparent that there has been provided with this invention an approach for resizing objects in a region of a VU in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for resizing objects in a region of a virtual universe (VU) residing on at least one computing device, comprising:
    defining the VU as a computer-based simulated environment intended for users to inhabit and interact via avatars, each of the avatars comprising a representation of one of the users of the VU;
    determining whether a region of the VU residing on the at least one computing device would exceed a capacity threshold by adding an avatar and a non-avatar object to the region, the non-avatar object corresponding to the avatar, the capacity threshold comprising an amount of unoccupied space in the region;
    reducing a size of existing objects in the region of the VU residing on the at least one computing device based on an amount calculated by dividing a number of avatars and non-avatar objects which the virtual space currently holds by a sum of: the number of avatars and non-avatar objects which the virtual space currently holds, plus the avatar and the non-avatar object;
    adding the avatar to the region of the VU residing on the at least one computing device;
    dynamically adding the non-avatar object to the region of the VU residing on the at least one computing device in response to the addition of the avatar to the region, each of the added avatar and the added non-avatar object being reduced in size, based on the calculated amount, from an original size; and
    increasing, based on the proportion, the size of the existing objects in the region of the VU residing on the at least one computing device in response to removal of the added avatar from the region.

2. The method of claim 1, the region comprising a room.

3. The method of claim 1, the determining-comprising:
    calculating the capacity of the region of the VU residing on the at least one computing device; and
    calculating a percentage of the capacity that would be occupied by the existing objects, the avatar, and the non-avatar object, the reducing being performed if the percentage exceeds approximately 100 percent.

4. The method of claim 1, further comprising increasing the size of the existing objects when the capacity is no longer exceeded.

5. A system for resizing objects in a region of a virtual universe (VU), comprising: a bus; a processor coupled to the bus; and a memory medium coupled to the bus, the memory medium comprising instructions to:
    define the VU as a computer-based simulated environment intended for users to inhabit and interact via avatars, each of the avatars comprising a representation of one of the users of the VU;
    determine whether a region of the VU would exceed a capacity threshold by adding an avatar and a proposed object comprising a non-avatar object to the region, the proposed object corresponding to the avatar, the capacity threshold comprising an amount of unoccupied space in the region;
    dynamically resize existing objects in the region based on an amount calculated by dividing a number of avatars and non-avatar objects which the virtual space currently holds by a sum of: the number of avatars and non-avatar objects which the virtual space currently holds, plus the avatar and the proposed object; and
    add the avatar into the region of the VU;
    add the proposed object to the region in response to the addition of the avatar to the region, each of the added avatar and the added non-avatar object being resized, based on the calculated amount, from an original size; and
    increase, based on the proportion, the size of the existing objects in the region in response to removal of the added avatar from the region;
    wherein the proposed object is at least one of a table, chair, and desk.

6. The system of claim 5, the region comprising a room.

7. The system of claim 5, the memory medium further comprising instructions to:
    calculate the capacity of the region; and calculate a percentage of the capacity that would be occupied by the existing objects, the avatar, and the proposed object, the resizing being performed if the percentage exceeds approximately 100 percent.

8. The system of claim 5, the memory medium further comprising instructions to increase the size of the existing objects when the capacity is no longer exceeded.

9. A computer program product for resizing objects in a region of a virtual universe (VU), the computer program product comprising a non-transitory computer readable storage media, and program instructions stored on the computer readable storage media, to:
    define the VU as a computer-based simulated environment intended for users to inhabit and interact via avatars, each of the avatars comprising a representation of one of the users of the VU;
    determine whether a region of the VU would exceed a capacity threshold by adding an avatar and a proposed object to the region, the proposed object comprising a non-avatar object corresponding to the avatar, the capacity threshold comprising an amount of unoccupied space in the region;
    dynamically resize existing objects in the region based on an amount calculated by dividing a number of avatars and non-avatar objects which the virtual space currently holds by a sum of: the number of avatars and non-avatar objects which the virtual space currently holds, plus the avatar and the proposed object; and
    add the avatar into the region of the VU;

add the proposed object to the region in response to the addition of the avatar to the region, each of the added avatar and the added non-avatar object being resized, based on the calculated amount, from an original size; and increase, based on the proportion, the size of the existing objects in the region in response to removal of the added avatar from the region;

wherein the proposed object is a separate image from the avatar.

10. The computer program product of claim 9, the region comprising a room.

11. The computer program product of claim 9, further comprising program instructions stored on the non-transitory computer readable storage media to:

calculate the capacity of the region; and calculate a percentage of the capacity that would be occupied by the existing objects, the avatar, and the proposed object, the resizing being performed if the percentage exceeds approximately 100 percent.

12. The computer program product of claim 9, further comprising program instructions stored on the non-transitory computer readable storage media to increase the size of the existing objects when the capacity is no longer exceeded.

13. A method for deploying a system for resizing objects in a virtual universe (VU), comprising:

providing a computer infrastructure being operable to:

define the VU as a computer-based simulated environment intended for users to inhabit and interact via avatars, each of the avatars comprising a representation of one of the users of the VU;

determine whether a region of the VU would exceed a capacity threshold by adding an avatar and at least one of a chair, desk, or table to the region, the proposed object corresponding to the avatar, the capacity threshold comprising an amount of unoccupied space in the region;

dynamically resize existing objects in the region based on an amount calculated by dividing a number of avatars and non-avatar objects which the virtual space currently holds by a sum of: the number of avatars and non-avatar objects which the virtual space currently holds, plus the avatar and at least one of a chair, desk, or table;

add the avatar into the region of the VU;

add the at least one of the chair, desk, or table to the region in response to the addition of the avatar to the region, each of the added avatar and the added non-avatar object being resized, based on the calculated amount, from an original size; and increase, based on the proportion, the size of the existing objects in the region in response to removal of the added avatar from the region.

* * * * *